July 23, 1940.　　　A. JACKSON ET AL　　　2,208,983
AUTOMOBILE LIFT
Filed March 6, 1939　　　2 Sheets-Sheet 1
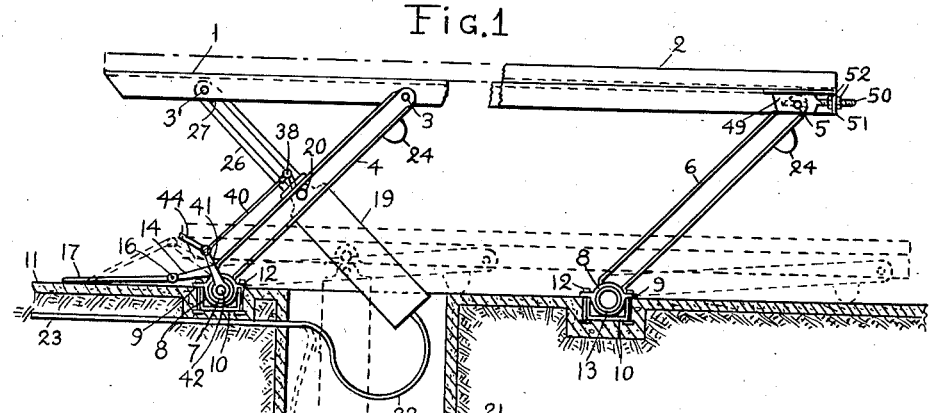
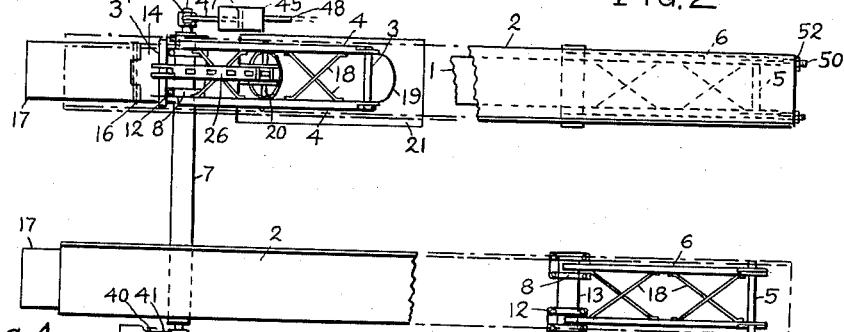
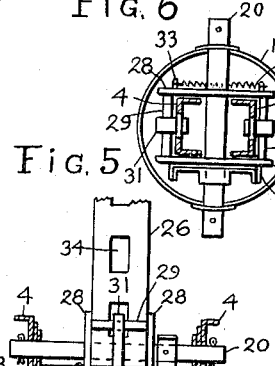
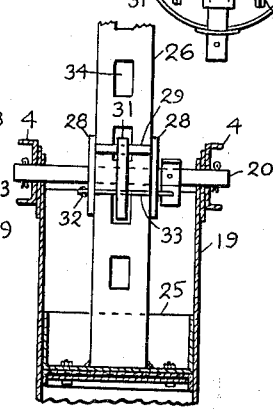
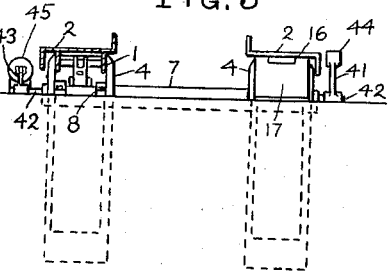
ALEXIS JACKSON
VADIM S. MAKAROFF
INVENTOR.
BY
ATTORNEY.

July 23, 1940.  A. JACKSON ET AL  2,208,983
AUTOMOBILE LIFT
Filed March 6, 1939   2 Sheets-Sheet 2

ALEXIS JACKSON
VADIM S. MAKAROFF
INVENTOR.

BY  John P. Nikonow
ATTORNEY.

Patented July 23, 1940

2,208,983

UNITED STATES PATENT OFFICE 2,208,983

AUTOMOBILE LIFT

Alexis Jackson, Astoria, and Vadim S. Makaroff, New York, N. Y.; said Jackson assignor to said Makaroff Application March 6, 1939, Serial No. 259,955

24 Claims. (Cl. 254—91)

Our invention relates to automobile lifts and has particular reference to apparatus for lifting automotive vehicles from the ground in a horizontal position for such work as may be required in service stations, garages, etc. Such lifts are therefore usually provided with a pair of rails for supporting the vehicle, the rails being pivotally mounted on parallel arms rotatively supported in a frame or base on the ground so that the rails and the arms form two hinged parallelograms with the base.

In lifting mechanisms of this type it is desirable to avoid obstructions between the lifting rails so as to provide a free passage for workmen under the vehicle, thereby facilitating their work. This is usually accomplished by placing the lifting motor or motors underground in a special subframe fitted in an excavation. Such a construction, however, is expensive, requiring heavy equipment buried in the excavation and not readily accessible for maintenance.

In order to avoid such difficulties and limitations of ordinary types of automobile lifts, we provide an arrangement in our improved lift whereby lifting motors are mounted between the lifting arms and the rails and move with the arms so that no subframe is required for supporting the lifting mechanism. With such an arrangement it is possible to connect the motor to the middle portion of the arm thereby reducing the lifting force so that cylinders of relatively small diameters can be used. In order to keep the space between the arms and rails free, the cylinder under each rail is placed inside the arm which is formed of two bars in spaced relation to each other at either side of the cylinder.

We prefer to provide cylinders for the rear arms only in which case it is desirable to relieve the front arms from the greater portion of the lifting strain. For this purpose we extend the rails to the rear beyond the pivoting point at the upper ends of the rear arms, the resulting overhang of the rails being used for supporting a portion of the vehicle so that its weight is supported principally by the rear or power arms equipped with the lifting motors.

In our present construction the overhanging portions of the rails are supported on the ends of the piston rods pivotally connected to these extensions at a distance from the points of support on the arms.

Although any suitable motors can be used in our lifts, we prefer to use motors formed of cylinders and pistons placed between the arms and the rails, arrangement being provided for admitting compressed fluid into the cylinders for moving the pistons, thereby changing the angle between the arms and the rails and therefore causing the arms and the rails to rise.

My invention is more fully described in the accompanying specification and drawings in which—

Fig. 1 is an elevational view of our lift partly in section in a raised position, the lower position being indicated in dotted lines.

Fig. 2 is a top plan view of the lift partly in section.

Fig. 3 is a rear view of the same.

Fig. 4 is a fractional detailed sectional view of the cylinder and piston.

Fig. 5 is a similar view, section being taken in another plane.

Fig. 6 is a sectional top view of the cylinder and piston.

Figure 7:
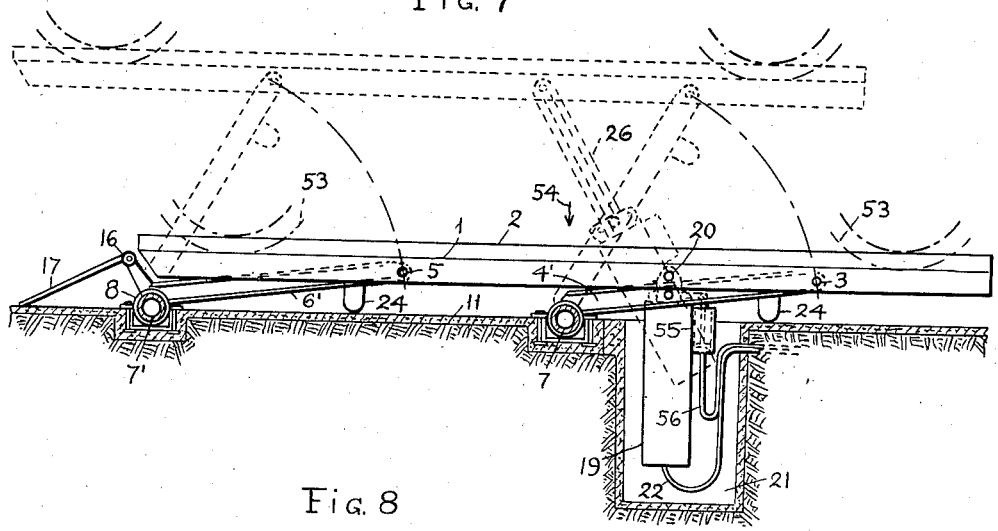
Fig. 7 is a sectional elevation of a modified lift.

Our automobile lift consists of a pair of rails having inner members 1 and outer or upper members 2, the latter being used for supporting an automotive vehicle (not shown) such as an automobile or truck. The outer rails may be omitted if the lift is intended for raising the vehicle on its axles, leaving the wheels free. The outer rails are desirable if it is intended to lift the vehicle on its wheels, and the rails 2 for this purpose are preferably made in the form of Z-bars, the raised inner flanges serving as guides for the wheels when the vehicle is driven on the rails. The inner rails are pivotally connected at 3 to the upper ends of rear arms 4, and at 5 to the upper ends of front arms 6.

The lower ends of the rear arms are fastened as by welding to a tubular shaft 7 journaled in tubular bearings 8 having flanges 9 resting on the edges of short channel bars 10. The bars may be imbedded in a concrete floor 11, the flanges 9 being fastened to the bars by bolts 12. The lower end of each of the front arms is fastened to a short tubular shaft 13 journaled in bearings 8 of the same type as the rear bearings and similarly supported on channel bars 10. The lower ends of the rear arms have lugs 14 extending at an angle to the arms and pivotally supporting at 16 the ends of plates 17. The latter form ramps or approaches for the rails 2, the angle of the lugs 14 being such that the hinges 16 are raised to the level of the rails when the arms are lowered to the ground as shown in dotted lines in Fig. 1. The arms are formed each of two bars 17 joined together by diagonal braces 18 forming a truss. The bars 17 are spaced apart at a distance sufficient for mounting a cylinder 19 for which purpose a shaft 20 is fitted in the bars 17 passing also through the walls of the cylinder near its upper open end, the lower end of the cylinder being closed. In one of the forms of this invention the cylinder is pivotally supported at the open end and hangs downward from the arm. A relatively narrow pit 21 is provided for the cylinder in the ground, the walls of the pit being lined with concrete. Air or other suitable fluid is admitted into the lower closed end of the cylinder through a flexible tube 22 extending from a supply pipe 23 in the wall of the pit, the pipe 23 being connected through a suitable valve (not shown) with a suitable source (not shown) of a compressed air or other compressed fluid. Bumpers 24, which may be made of metal or rubber, are supported on the under sides of the arms and rest on the ground when the lift is lowered. As shown in the drawings, the arms in the lowered position form a small angle with the base or with the rails, this angle being about 7-8°.

A piston 25 is slidably fitted in the cylinder 19 and has a rod formed of two channel bars 26 joined together at the top by an end piece 27 with a hole for the pin 3. The bars 26 are spaced apart to make room for the shaft 20 which also mounts plates 28. The latter are connected together by pins 29 and carry pins 30 rotatively supporting dogs 31. The latter are pulled together by a spring 32 engaging pins or lugs 33 on the dogs, these lugs extending to the sides of the bars 26 so that the spring 32 is positioned at the side of the bars 26. The dogs 31 are made to engage holes 34 in the channels 26. The lower ends of the dogs are sharpened as shown so that the dogs are automatically released from the slots or holes 34 when the lift is being raised by the pressure from the bridges 35 between the slots. The dogs immediately lock the piston in a given position in relation to the cylinder when the lifting operation is stopped, i. e., when the air valve for the cylinder is closed. For lowering the lift, the locking dogs must be released, which may be accomplished in any suitable manner, as, for instance, by a double cam member 36 rotatively mounted on the shaft 20 and provided with an arm 37 pivotally connected at 38 to a clevis 39 adjustably screwed on the end of a pull rod 40. The other end of the rod is connected to a lever 41 rigidly mounted on the end of a shaft 42 rotatively fitted in the main tubular shaft 7. The other end of the shaft 42 has a similar lever 43 operatively connected to a cam member on the second piston rod. A pedal 44 extends from the lever 41 for manual operation of both dog releasing cam members. The releasing cam member can be also operated by a fluid operated motor in the form of a cylinder 45 with a piston 46 having a rod 47 connected to the lever 43. A pipe 48 connects the cylinder with a source of fluid under pressure, such as compressed air.

Our lift has numerous advantages over other similar lifts, one of the main advantages being a much lighter weight for the same lifting power since no metal base is required and no metal subframe box is needed for mounting the lifting mechanism. The installation is also greatly simplified by the elimination of the frame and subframe, only simple bearings being necessary. For the final adjustment of the parallel alignment of the front or rear arms, the rails at the front ends of the arms have elongated holes for the pivots 5, the latter being fitted in sliding blocks 49 with attached bolts 50. The end portions of the bolts pass through holes in flanges 51 on the ends of the rails and are held by nuts 52. Another advantage of this lift resides in its relatively greater rigidity as against transverse vibrations, this rigidity being due to the truss-like construction of the arms. There being no parts of the mechanism between the rails, all this space is free and unobstructed for work on the under side of a vehicle in its raised position. The pivoted end of the piston rod affords an additional support for the rear overhanging ends of the rails so that the latter may be made of a relatively lighter shape, making it possible to concentrate the weight of the vehicle over the power arms supporting the lifting mechanism.

It should be noted that under certain conditions it may be desirable to so adjust the front pivots 5 that the structure will cease to be a true parallelogram, in order to keep the front arms slightly raised when the rear arms are fully lowered. This will facilitate raising the front arms, the rails more nearly approaching the true horizontal position in the raised position. The term "parallelogram" should be therefore understood to include a four-cornered structure which may slightly deviate from the true parallelogram form.

The cylinders 19 can be placed on the front arms 4' as shown in Fig. 7, in which case the rods 26 will support the middle portion of the rails, thereby relieving their bending stress. Another advantage of this arrangement is that it is possible to place an automobile (indicated by its wheels 53) in such a position that its center of gravity will be located above the power shaft 7 when the arms are lowered as shown by an arrow 54 in Fig. 7. Less power is then required for raising the rear arms 6', the full weight of the vehicle being balanced on the front arms and on the shaft 7.

Figure 8:
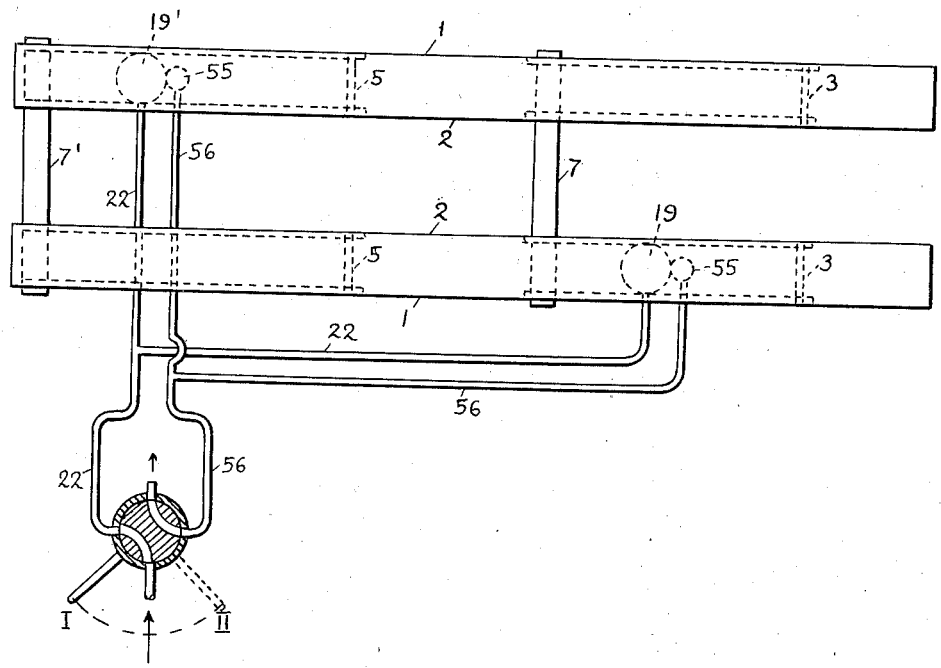
Fig. 8 is a top plan view of another modification.

The latch releasing lever or arm 37 can be directly operated by an auxiliary air cylinder 55 as shown in Figs. 7 and 8, the cylinder being mounted on the main cylinder 19. The plunger 47 is then pivotally connected to the arm 37. A flexible pipe 56 connects the cylinder with a source of compressed air (not shown) through a suitable valve.

Another modification is shown in Fig. 8, the cylinders 19 being placed diagonally on one front and one rear arm, the rear arms being rigidly mounted on a shaft 7', similarly to the front arms mounted on the shaft 7. This arrangement has an advantage in that the lifting force is equally distributed on the front and rear arms. A central valve 57 is provided for controlling the compressed air or other suitable fluid under pressure for operating the main cylinders 19 and the auxiliary or releasing cylinders 55 as shown in Fig. 8. In the position shown the compressed air is delivered by a pipe 58 through the valve 57 into the pipes 22, while the air from the auxiliary cylinders 55 is exhausted into the atmosphere through the pipe 59. The releasing cylinders are thus made inoperative permitting the operation of the locking dogs 31, while the main cylinders are energized for raising the arms with the rails. For lowering the arms, the valve is turned by the handle 60 into position II thereby energizing the auxiliary cylinders and exhausting the air from the main cylinders.

It is understood that our automobile lift may be further modified without departing from the spirit of our invention as set forth in the appended claims.

We claim as our invention:

1. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor interposed between the arms and the rails, and means to change the angle between the arms and the rails by the motor for raising and lowering the arms with the rails.

2. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor interposed between the arms and the rails, means to change the angle between the arms and the rails by motor for raising and lowering the arms with the rails, and means to releasably lock the motor, thereby locking the arms with the rails in the raised position.

3. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor mounted on the arms, operative connections between the motor and the rails for changing the angle between the arms and the rails, and means to energize the motor for increasing said angle, thereby raising the rails.

4. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor comprising a cylinder member and a piston member in sliding relation to each other, one of said members being connected with one of the arms, the other of said members being connected with the corresponding rail, and means to admit a fluid under pressure into the cylinder for increasing the angle between the arms and the rails, thereby raising the arms with the rails.

5. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, two motors comprising each a cylinder member and a piston member slidably fitted in the cylinder member, one of the members being connected with one of the arms and the other with one of the rails, means to energize the motors for simultaneously raising both rails, and means on the piston member for releasable locking the two members together.

6. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, the cylinder being pivotally connected with the arm, a rod extending from the piston pivotally connected with the rail, and means to energize the motor for moving the piston, thereby increasing the angle between the arm and the rail for raising the arm with the rail.

7. An automobile lift comprising a front and a rear arm, means to rotatively support the lower ends of the arms, a rail pivotally connected with the upper ends of the arms adapted to support a vehicle, and a motor operatively interposed between one of the arms and the rail for changing the angle between the arm and the rail.

8. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, a shaft on the arm pivotally supporting the cylinder, a rod extending from the piston pivotally connected with the rail, the motor when energized being adapted to increase the angle between the rail and the arm for raising the front and rear arms with the rail, the rod having a plurality of longitudinally extending slots, and dogs mounted on the shaft releasably engaging the slots.

9. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder member and a piston member slidably fitted in the cylinder member, one of the members being pivotally connected with the middle portion of the rear arm, the other member being pivotally connected with the rear portion of the rail at a distance from the upper end of the arm, the rail extending to the rear from the rear point of support on the arm to a distance comparable to the distance between the ends of the arms, the rear arms being thereby adapted to support the major portion of the weight of a vehicle, the front arms being largely relieved from the load of the vehicle, and means to admit compressed fluid into the cylinder for moving the piston from the cylinder thereby increasing the angle between the arm and raising the rail.

10. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder member and a piston member slidably fitted in the cylinder member, one of the members being pivotally connected with the middle portion of the rear arm, the other member being pivotally connected with the rear portion of the rail at a distance from the upper end of the arm, the rails being so positioned on the arms as to support the major portion of the weight of a vehicle on the rear arms.

11. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, the cylinder being pivotally connected with the arm, a rod extending from the piston pivotally connected with the rail, means to energize the motor for moving the piston, thereby increasing the angle between the arm and the rail for raising the arm with the rail, lugs extending from the lower ends of the rear arms, and plates hingedly mounted on the lugs, the lugs being at an angle to the arms so as to raise the hinged connection of the plate to the rails when the rails are lowered, the plates in the raised position forming ramps for driving a vehicle on the rails.

12. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, two motors comprising each a cylinder member and a piston member slidably fitted in the cylinder member, one of the members being connected with one of the arms and the other with one of the rails, means to energize the motors for simultaneously raising both rails, means on each piston member for releasably locking the two members together, and means to simultaneously release the locking means on both piston members.

13. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, a shaft on the arm pivotally supporting the cylinder, a rod extending from the piston pivotally connected with the rail, the motor when energized being adapted to increase the angle between the rail and the arm for raising the front and rear arms with the rails, the rod having a plurality of longitudinally extending slots, dogs pivotally mounted on the shaft releasably engaging the slots, and means to manually release the dogs simultaneously on the rods of both pistons for lowering the arms.

14. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, a shaft on the arm pivotally supporting the cylinder, a rod extending from the piston pivotally connected with the rail, the motor when energized being adapted to increase the angle between the rail and the arm for raising the front and rear arms with the rails, the rod having a plurality of longitudinally extending slots in the opposite sides, plates rotatively mounted on the shaft at the opposite sides of the rod, dogs pivotally supported on the plates and adapted to releasably engage the slots, means to yieldably urge the dogs against the rod, and means to manually release the dogs.

15. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms fo maintaining the rails in a horizontal position, each arm being formed of two bars rigidly connected together in spaced relation, motors pivotally supported between the bars of the arms, operative connections between the motor and the respective rail, and means to energize the motor, the motor when energized being adapted to increase the angle between the arm and the rail thereby raising the arm and the rail.

16. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, each arm being formed of two bars rigidly connected together in spaced relation, a cylinder pivotally supported between the bars of one arm, a piston slidably fitted in the cylinder, a rod on the piston pivotally connected with the respective rail, and means to admit a fluid under pressure into the cylinder thereby lifting the arm and the rail with the piston and the cylinder.

17. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor mounted on the arms, operative connections between the motor and the rails for changing the angle between the arms and the rails, means to energize the motor for increasing said angle, thereby raising the rails, and means to adjust the distances between the pivoting points on each rail.

18. An automobile lift comprising front arms and rear arms, means to rotatively support the arms at the level of the ground, a pair of rails pivotally supported at the upper ends of the arms and adapted to support an automotive vehicle, the rails and the arms with their supporting means forming two hinged parallelograms for maintaining the rails in a horizontal position, a motor mounted on the arms, operative connections between the motor and the rails for changing the angle between the arms and the rails, and means to energize the motor for increasing said angle, thereby raising the rails, the parallelograms being connected together at the level of the ground for simultaneous motion under action of the motor.

19. An automobile lift comprising front arms and rear arms, means to rotatively support the arms, a pair of rails pivotally supported at the upper ends of the arms and adapted to support an automotive vehicle, the rails and the arms with their supporting means forming two hinged parallelograms for maintaining the rails in a horizontal position, a motor interposed between one front arm and the corresponding rail, a second motor interposed between one rear arm and the other rail diagonally opposite the first motor, means to energize the motors for raising the arms and the rails, means to lock the arms and the rails in the raised position, means to release the locking means and to simultaneously deenergize the motors for lowering the rails, and rigid connections between each pair of arms at the level of the floor, the arms and the rails forming a clear passage therethrough when in the raised position.

20. An automobile lift comprising right and left sets of front and rear arms, means to rotatively support the lower ends of the arms, right and left rails pivotally supported on the upper ends of the arms, the arms and the rails with the supporting means forming two hinged parallelograms, a motor for each rail comprising a cylinder and a piston slidably fitted in the cylinder, the point of connection of the motor with the rail being at a point intermediate the two points of connection between the front and rear arms and the rail, the rails being so positioned on the arms as to cause the center of gravity of a vehicle placed on the rails to be approximately opposite the pivoting point at the base of the arm carrying the motor when the arm is in the lowered position, thereby relieving the other arm connected with said rail from the load at the beginning of the lifting operation.

21. In a lifting device, a floor, a platform for supporting the load to be lifted, a series of arms having articulate connections with said platform, means for supporting said arms on said floor, a motor device comprising a cylinder below one of said arms and pivoted thereto, and a piston in said cylinder having a rod extending to said platform, and means for supplying fluid to and withdrawing fluid from said cylinder to raise and lower said platform.

22. A lifting device comprising front and rear arms, means supporting the lower ends of said arms, a rail pivotally connected with the upper ends of said arms for supporting the load to be lifted, an extensible link pivotally connecting one of said arms and said rail at points respectively spaced from the pivot point at which that arm is connected to said rail, a motor device associated with said extensible arm for changing the length of the arm and thereby raising and lowering the lift.

23. A lifting device comprising a front arm and a rear arm, means supporting the lower ends of said arms, a platform adapted to support the load to be lifted, pivot devices connecting the upper ends of said arms with said platform, the arms occupying a position substantially parallel to said platform when in lower position and at a substantial angle with said platform when in upper position, an extensible link connected to said platform between said pivot devices and to that arm which lies adjacent to the platform when the lifting device is in lower position, whereby to support said platform between said pivot devices, and a motor device associated with said extensible link.

24. A lifting device for automotive vehicles and the like comprising spaced front arms and spaced rear arms, a first rail connecting one set of front and rear arms, a second rail connecting the other set of front and rear arms, motor devices operating between certain of said arms and said rails, a floor supporting said arms, said floor having pits of small cross dimension under said rails and said arms into which said motors move when the lift is in lower position, the floor between said rails being at approximately the same level as the surrounding floor.

ALEXIS JACKSON.
VADIM S. MAKAROFF.